US009663250B1

(12) United States Patent
Gravseth et al.

(10) Patent No.: US 9,663,250 B1
(45) Date of Patent: May 30, 2017

(54) METHOD AND APPARATUS FOR PASSIVELY SLOWING THE SPIN RATE OF ORBITAL OBJECTS

(71) Applicant: Ball Aerospace & Technologies Corp., Boulder, CO (US)

(72) Inventors: Ian J. Gravseth, Longmont, CO (US); Reuben R. Rohrschneider, Longmont, CO (US); Robert F. Arentz, Boulder, CO (US)

(73) Assignee: BALL AEROSPACE & TECHNOLOGIES CORP., Boulder, CO (US)

( * ) Notice: Subject to any disclaimer, the term of this patent is extended or adjusted under 35 U.S.C. 154(b) by 865 days.

(21) Appl. No.: 14/040,145

(22) Filed: Sep. 27, 2013

Related U.S. Application Data

(60) Provisional application No. 61/707,368, filed on Sep. 28, 2012.

(51) Int. Cl.
*B64G 1/24* (2006.01)
*B64G 1/32* (2006.01)
*B64G 1/38* (2006.01)

(52) U.S. Cl.
CPC .......... *B64G 1/24* (2013.01); *B64G 1/32* (2013.01); *B64G 1/38* (2013.01)

(58) Field of Classification Search
CPC ............. B64G 1/24; B64G 1/32; B64G 1/38
See application file for complete search history.

(56) References Cited

U.S. PATENT DOCUMENTS

| 3,114,518 | A | | 12/1963 | Fischell | |
|---|---|---|---|---|---|
| 3,118,637 | A | | 1/1964 | Fischell et al. | |
| 3,162,396 | A | * | 12/1964 | Rongved | B64G 1/28 188/267 |
| 3,399,317 | A | * | 8/1968 | Davis | B64G 1/24 244/1 R |
| 3,601,338 | A | * | 8/1971 | Shigehara | B64G 1/24 244/167 |

(Continued)

OTHER PUBLICATIONS

Kadaba et al., "Feasibility of Noncontacting Electromagnetic Despinning of a Satellite by Inducing Eddy Currents in its Skin-Part II: Design Implementation," IEEE Transactions on Magnetics, 1995, vol. 31, No. 4, pp. 2478-2485.

(Continued)

*Primary Examiner* — Nicholas McFall
(74) *Attorney, Agent, or Firm* — Sheridan Ross P.C.

(57) ABSTRACT

Methods and systems for passively slowing the spin rate of an uncontrolled object in space are presented. A damper mechanism is provided that includes a magnet that is free to rotate in any direction about a central point with respect to a carrier or outer housing. The magnet can be carried within an inner element or sphere, that is in turn mounted within an outer sphere. The inner and outer spheres can be separated by a viscous fluid or other mechanism in which damping can be introduced. The damper mechanism can be associated with an attachment mechanism, that secures the resulting damper or despin system to a target object. A method of neutralizing the magnetic field is also included to enable the system to be launched in a passive state.

18 Claims, 4 Drawing Sheets

(56) References Cited

U.S. PATENT DOCUMENTS 5,139,217 A * 8/1992 Adams ................... B64G 1/38
244/164

OTHER PUBLICATIONS

Reyhanoglu et al., "Three-Axis Magnetic Attitude Control Algorithms for Small Satellites," 5th Int'l Conference on Recent Advances in Space Technologies (RAST), Jun. 9-11, 2011, pp. 897-902.

* cited by examiner

METHOD AND APPARATUS FOR PASSIVELY SLOWING THE SPIN RATE OF ORBITAL OBJECTS

CROSS-REFERENCE TO RELATED APPLICATIONS

This application claims the benefit of U.S. Provisional Patent Application Ser. No. 61/707,368, filed Sep. 28, 2012, the entire disclosure of which is hereby incorporated herein by reference.

FIELD

Methods and systems for passively slowing the spin rate of an object in space are presented. More particularly, passive despin systems that include a magnet interconnected to a carrier and methods for utilizing such systems to cause an object in orbit to slow its spin rate to match that of the rotation rate of the Earth's magnetic field in the orbit frame are provided.

BACKGROUND

Uncontrolled satellites and debris in orbit about the Earth are an increasingly serious problem. In particular, such objects pose a risk of collision with other satellites and spacecraft. According to studies by NASA's debris office, controlling the propagation of the on-orbit debris environment can be accomplished by actively removing at least five large debris objects such as rocket bodies, boosters and derelict spacecraft per year. However, such objects are difficult to capture and move, either out of orbit or into orbits considered safe. One difficulty is that some percentage of these objects remain spinning in orbit at relatively high rates, or acquire a spin, as a result of disturbance torques which act on the object.

In order to actively remove these objects from orbit, many studies have considered using a secondary spacecraft to approach, rendezvous and dock with the target and, using an applied thrust, change their combined orbit so that the object will reenter Earth's atmosphere within 25 years or less. The difficulty of proximity operations increases dramatically as the spin rate of the target object increases. Decreasing the spin rate of the target object would allow more time for sensor data processing, which would significantly decrease the processing requirements for the active spacecraft and also dramatically decrease its propulsion requirements. However, the ability to decrease the spin rate of objects in space has been limited.

SUMMARY

In accordance with embodiments of the present disclosure, a passive despin system includes a damper mechanism and an attachment mechanism. The damper mechanism includes a first element or carrier to which a magnet or set of magnets is mounted. An interconnection allows the magnet to rotate independently of the carrier. As a result, the magnet can remain aligned with an external magnetic field, such as the magnetic field of the Earth, while the carrier can rotate, for example with a spinning satellite to which the despin system is connected. In accordance with still other embodiments of the present disclosure, the rotation of the magnet relative to the carrier is damped.

Embodiments of the disclosed passive despin system can include a passive despin or damper mechanism or device consisting of a large magnet or set of magnets held within a sphere (hereinafter referred to as the "inner sphere"). This sphere is suspended within a carrier comprising a second sphere (herein after referred to as the "outer sphere") that is slightly larger than the inner sphere. The interconnection between the magnet and the carrier includes the outer surface of the inner sphere, the inner surface of the outer sphere, and a layer of a viscous fluid suspended between the two spheres. The cooperating surfaces of the spheres need not be continuous. For example, one or both of the spheres can include a spherical surface that is a partial or discontinuous surface. In accordance with still other embodiments, the magnet assembly is connected to the carrier by an interconnection comprising a three axis gimbal.

The despin system can additionally include an attachment mechanism. The attachment mechanism is configured to secure the despin system to a satellite or other object. As examples, but without limitation, the attachment mechanism can comprise a grapple, a piercing element, a chemical adhesive, or a structure configured to mate with or attach to a structure of the object.

Methods in accordance with embodiments of the present disclosure can include operably associating the despin mechanism with an object in orbit. For example, a despin assembly that includes an attachment mechanism can be brought into the proximity of an object while the object is in orbit. The despin assembly can then be attached to the object using the features of the attachment mechanism. Examples of attachment methods include but are not limited to piercing an outer shell of an object and expanding an element within an interior of the object, grasping or grappling an exterior of the object, fixing an element or elements to an exterior of the object using an adhesive, or attaching to a mounting surface on the object. As a further example, a despin system can be deployed with or as part of an object. During launch, while placing the object in the desired orbit, and/or during normal operation, the despin system can be deactivated. The despin mechanism can then be enabled, for example at or around a time at which attitude control of the object is otherwise lost.

DETAILED DESCRIPTION

Figure 1:
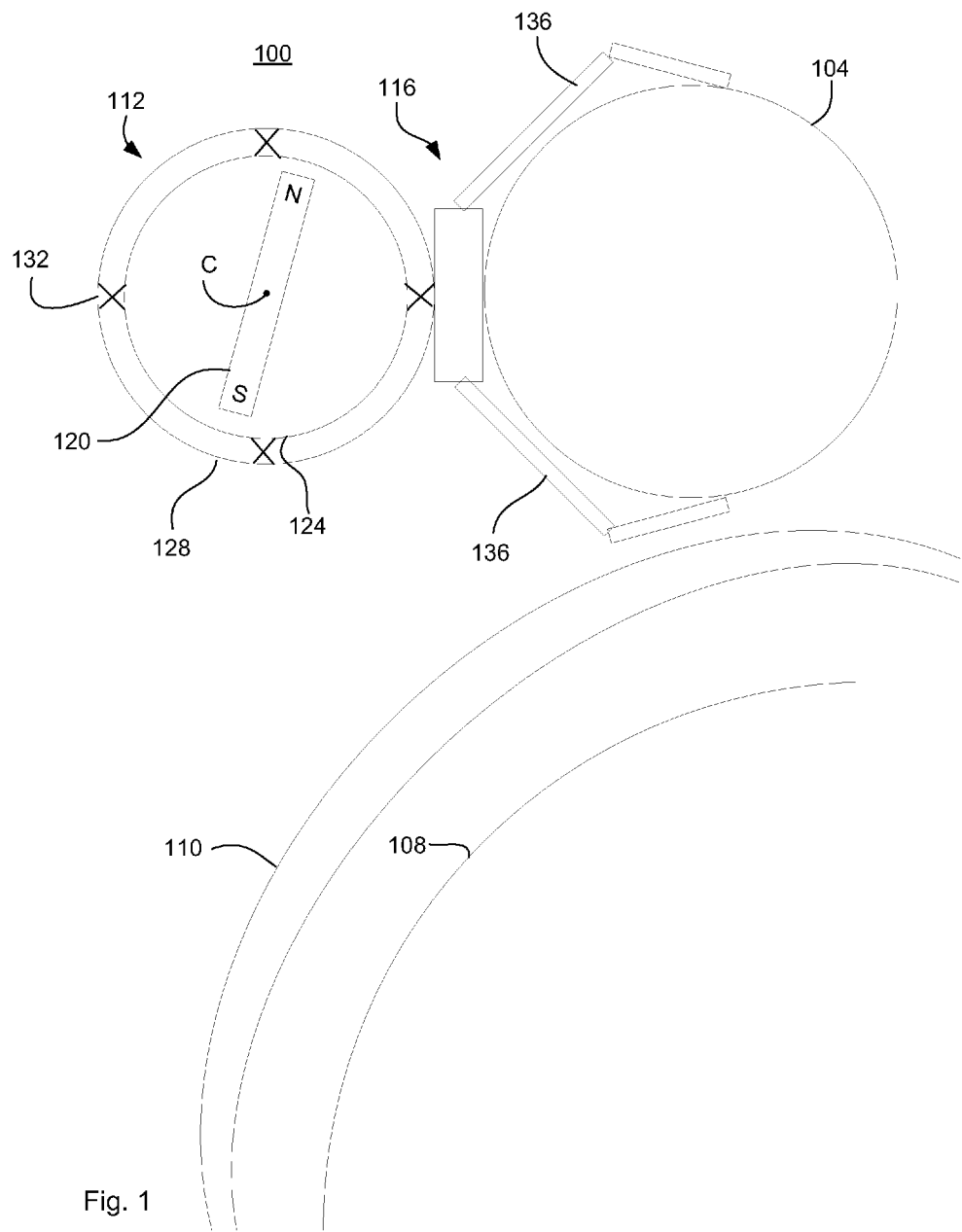
FIG. 1 depicts aspects of an example passive despin system attached to an orbiting body in accordance with embodiments of the present disclosure.

FIG. 1 depicts a passive despin system 100 as disclosed herein attached to an object or target object 104 in orbit about a body 108 having a magnetic field 110. The despin system 100 generally includes a damper or despin mechanism 112, and an attachment mechanism 116. The damper mechanism 112, shown in cross-section, includes a magnet or set of magnets 120 connected to an inner element 124. Where the magnet 120 comprises a plurality of magnets, the magnetic fields of the individual magnets are aligned with one another. The inner element 124 is in turn joined to an outer element or carrier 128 by an interconnection 132. The interconnection 132 allows the inner element 124, and in turn the magnet or magnets 120 to rotate in any direction about a central point C relative to the outer element or carrier 128. Accordingly, when the damper mechanism 112 is connected to a target object 104, the carrier 128 rotates with the object 104, while the magnet 120 and inner element 124 can rotate independently of the object.

As can be appreciated by one of skill in the art, a magnet floating in space will align itself with an external magnetic field, such as is present about the Earth, and if it is in orbit, it will rotate on average at twice orbit rate. As can also be appreciated by one of skill in the art after consideration of the present disclosure, with the damper mechanism 112 attached to an object 104 in orbit, the magnet 120 will align itself with the external magnetic field 110 and will remain aligned with the external magnetic field 110 while the carrier 128 rotates with the object 104. The resulting relative movement between the inner element 124 to which the magnet 120 is attached and the carrier 128 can be dampened by friction in the interconnection 132 between the inner element 124 and the carrier 128. Accordingly, rotational energy in the object 104 can be dissipated as heat.

The attachment mechanism 116 is fixed to the carrier 128, and provides a mechanism by which the damper mechanism 112 can be attached to the target object 104. In the example of FIG. 1, the attachment mechanism 116 includes a plurality of grapples or arms 136, to provide a mechanical interconnection between the damper mechanism 112 and the object 104. However, as discussed elsewhere herein, other means for attachment, including but not limited to adhesives, mating fixtures, or the like can be provided. Moreover, an object 104 to which the damper mechanism 112 can be attached includes but is not limited to a satellite or debris.

FIGS. 2A-2D depict different exemplary configurations of a damper mechanism 112 in accordance with embodiments of the present disclosure in cross section. In general, the damper mechanism 112 includes a magnet or set of magnets 120 comprising or provided as part of an inner element 124. The inner element 124 is in turn joined to a carrier or outer element 128 by an interconnection 132. The interconnection 132 permits rotation of the magnet 120 in any direction about a center point C relative to the carrier 128.

Figure 2A:
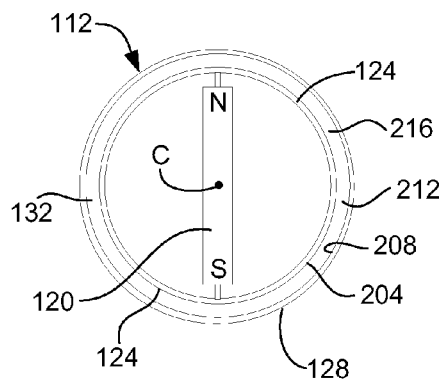
FIG. 2A is a cross-section of a damper mechanism in accordance with embodiments of the present disclosure.

In the exemplary embodiment illustrated in FIG. 2A, the inner element 124 has a spherical outer surface 204 that faces a spherical inner surface 208 of the outer element or carrier 128. As shown, the diameter of the outer surface 204 of the inner element 124 is smaller than the diameter of the inner surface 208 of the carrier 128, creating a volume 212 there between. In the figure, the difference in diameter between the opposing surfaces 204 and 208 is exaggerated for purposes of illustration. However, in a typical implementation, the difference is small. For example, but without limitation, for an inner surface 204 with a diameter of about 20 cm the gap between the surfaces 204 and 208 is about 2 cm or less. A viscous fluid 216 is placed in the volume 212. As an example, but without limitation, the viscous fluid 216 may comprise a synthetic oil, or other fluid that maintains a desired viscosity over an expected range of operating temperatures. Alternatively or in addition, the damper mechanism 112 can incorporate a heating element to maintain a desired fluid 216 viscosity.

As can be appreciated by one of skill in the art after consideration of the present disclosure, the inner element 124 can be constructed from two or more elements formed from a nonmagnetic material that together form the spherical outer surface 204, and an interior volume to which the magnet or magnets 120 can be secured. Examples of suitable nonmagnetic materials include but are not limited to titanium, aluminum, stainless steel, copper, fiberglass, and glass. The carrier 128 can likewise be constructed from two or more elements formed from a nonmagnetic material that together form the spherical inner surface 208, and that can be secured around the spherical outer surface 204. Prior to sealing the carrier 128 about the inner element 124, the viscous fluid 216 can be injected into the volume 212. Alternatively or in addition, a port can be provided in the carrier 128 for injecting the viscous fluid 216 into the volume 212 before the volume 212 is sealed.

The magnet or magnets 120 can be in the form of a permanent magnet or set of permanent magnets. Where a plurality of magnets are utilized, their poles are aligned with one another. In general, by providing a magnet 120 that is relatively strong, the time required to dampen the rotation of the target object 104 relative to the external magnetic field will be shorter than for a magnet 120 that is relatively weak. The dampening effect of the damper mechanism 112 can also be enhanced by providing a more viscous fluid 216.

Figure 2B:
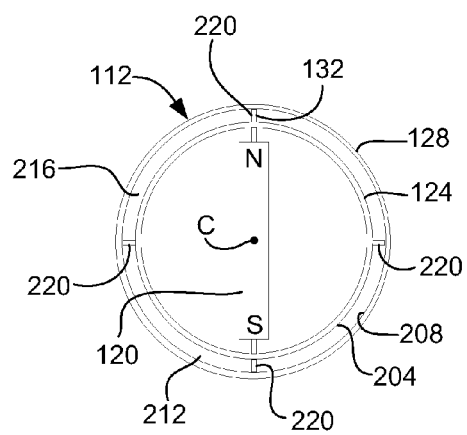
FIG. 2B is a cross-section of a damper mechanism in accordance with other embodiments of the present disclosure.

In the example illustrated in FIG. 2B, the interconnection 132 between the inner element 124 and the carrier 128 incorporates a plurality of bearings 220 located within the volume 212. As in the previous example, the inner element 124 and the carrier 128 include facing, spherical surfaces 204 and 208. In a typical implementation, both of the surfaces 204 and 208 are complete spherical surfaces. In accordance with other embodiments, one of the surfaces can include voids or discontinuities. For example, one of the surfaces can include a plurality of surfaces that have relative locations defining points on a spherical surface. The bearings 220 can be in the form of pucks, dots, rings, races or other shapes disposed between the spherical surface 204 of the inner element 124 and the spherical surface 208 of the carrier or outer element 128, such that a spacing is maintained between the opposing spherical surfaces 204 and 208. The bearings 220 can incorporate or be associated with elements that maintain a desired spacing between individual bearings 220. Alternatively or in addition, the bearings 220 can be fixed to one of the surfaces 204 or 208. In accordance with at least some embodiments, the bearings can comprise ridges, hemispheres or other shapes that are integral to and that extend from one of the elements 124 or 128. A viscous fluid 216 can be included in the volume 212 with the bearings 220. In accordance with still other embodiments, the bearings 220 can be formed from a self lubricating material, and therefore a viscous fluid 216 need not be provided.

Figure 2C:
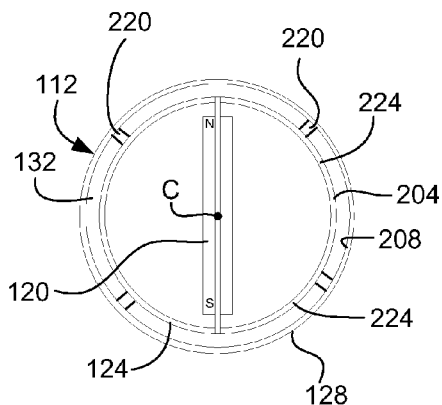
FIG. 2C is a cross-section of a damper mechanism in accordance with other embodiments of the present disclosure.

In the example of FIG. 2C, the damper mechanism 112 includes an inner element 124 that includes a discontinuous spherical surface 204. In particular, the example shows an inner element 124 that includes a pair of equatorial bands 224. The outer surfaces of the equatorial bands 224 generally lie on a spherical surface 204 that is centered at point C and that is concentric with a facing spherical surface 208 defined by the carrier 128. The outer surfaces of the equatorial bands 224 and the facing spherical surface 208 can function as opposed bearing surfaces. Moreover, bearing surfaces can be coated by a viscous fluid. Alternatively or in addition, bearings 220 can be fixed to the equatorial bands 224. In alternate embodiments, the carrier 128 can incorporate equatorial bands or other discontinuous spherical surface 208 elements in cooperation with an inner element 204 that provides a continuous spherical surface.

Figure 2D:
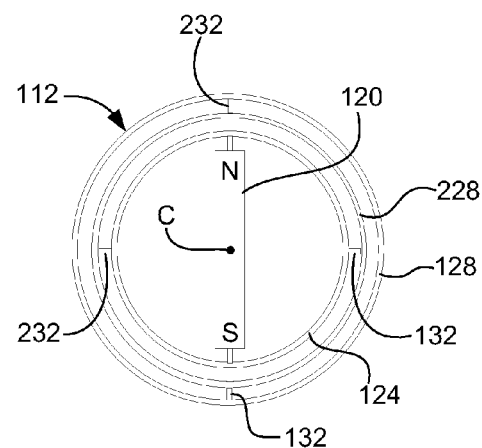
FIG. 2D is a cross-section of a damper mechanism in accordance with other embodiments of the present disclosure.

In the example damper mechanism 112 of FIG. 2D, the interconnection 132 comprises a gimbal structure that allows rotation of the magnet 120 relative to the carrier 128 in any direction about a center point C. More particularly, the interconnection 132 can include an intermediate equatorial ring 228 and sets of orthogonally aligned bearings 232. In accordance with still other embodiments, the bearings 232 may incorporate or be associated with braking mechanisms to dissipate rotational energy as heat.

Figure 2E:
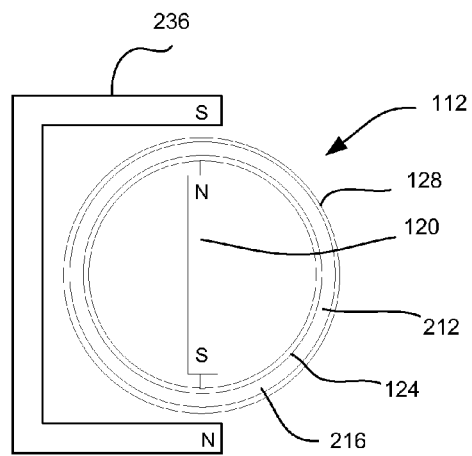
FIG. 2E is a cross-section of a damper mechanism in accordance with embodiments of the present disclosure, with a magnetic field neutralizing element.

In the example damper mechanism 112 of FIG. 2E, a magnetic field neutralizing element or mechanism 236 is provided. The magnetic field neutralizing element 236 may comprise a permanent magnet, electromagnet, or combination thereof. Moreover, the poles of the neutralizing element 236 are aligned such that they are opposite those of the magnet 120. The relative strengths of the magnetic fields of the magnet 120 and the magnetic field neutralizing element 236 can be selected so that the combined magnetic field is negligible with respect to the operation of a vehicle or other system carrying or associated with the damper mechanism. For example, where a despin system 100 is deployed as part of an object 104, the magnetic field neutralizing element 236 may be in place during launch and normal operation of the object 104. The magnetic field neutralizing element 236 can then be removed or otherwise deactivated to allow operation of the damper mechanism 112. Although depicted as a horseshoe type element, the magnetic field neutralizing mechanism 236 can be configured in different ways. For example, the magnet 120 can be formed from a plurality of magnets, with individual magnets oppositely aligned, so that the overall magnetic field of the magnet 120 is neutralized. In such an embodiment, the damper mechanism 112 can be activated by moving the individual magnets so that their magnetic fields are aligned with one another.

Figure 3:
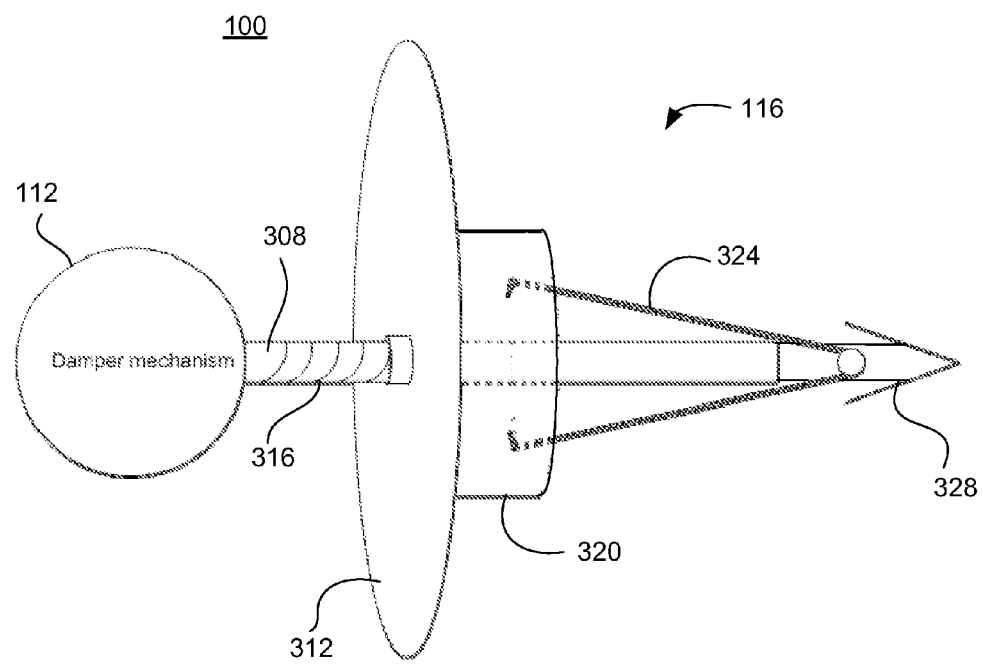
FIG. 3 depicts aspects of another example passive despin system attached to an orbiting body in accordance with embodiments of the present disclosure.

FIG. 3 depicts a despin system 100 that includes the damper or despin mechanism 112, and an attachment mechanism 116. More particularly, the damper mechanism 112 is fixed to the attachment mechanism 116. The attachment mechanism 116 is generally configured to facilitate a secure attachment of the despin system 100 to an orbiting object 104, including but not limited to a satellite, or debris. In the exemplary embodiment illustrated in FIG. 3, the attachment mechanism 116 includes a central strut 308 that is fixed to the damper mechanism 112 at a first end. The central strut 308 can extend through a trigger plate 312. The trigger plate 312 is biased away from the despin mechanism 112 by a coil spring 316. The trigger plate 312 includes a sleeve 320 that receives spring loaded arms 324. The spring loaded arms 324 are mounted at or proximate to a second end of the central strut 308. The attachment mechanism 116 in the example also generally includes a penetrating tip 328.

Figure 4:
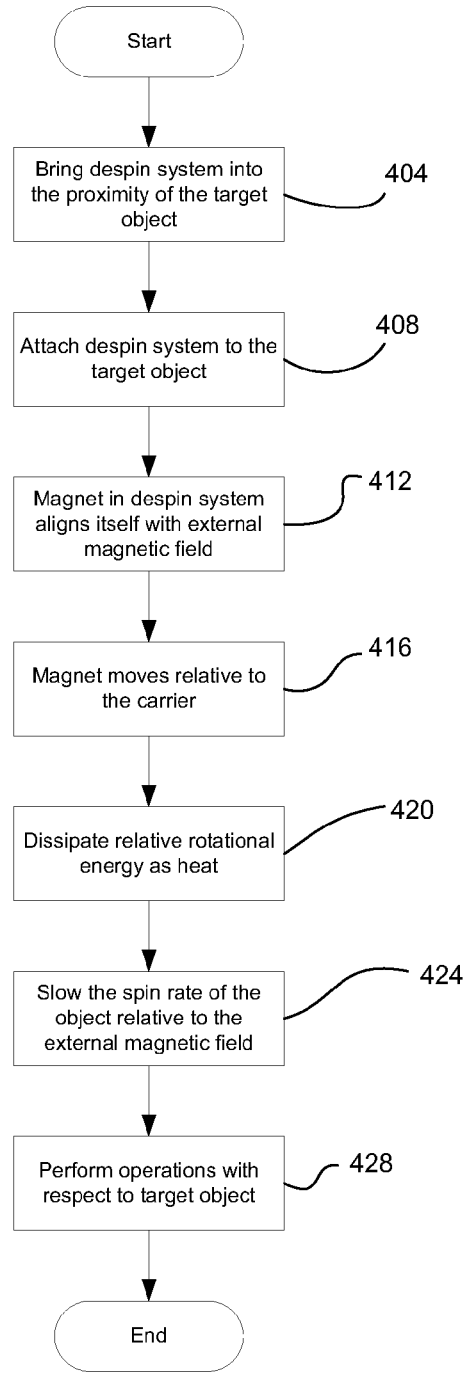
FIG. 4 is a flowchart depicting aspects of a method for passively despinning an object.

With reference now to FIG. 4, aspects of a method for passively despinning or reducing a spin rate of an orbiting object 104 are depicted. Initially, at step 404, the passive despin system 100 is brought into the proximity of the target object 104. For example, the passive despin system 100 can be deployed from a rocket, shuttle, or other vehicle while the vehicle is itself in orbit. The despin system 100 is then attached to the target object 104 (step 408). Various techniques may be utilized for attaching the despin system 100 to the target object 104, depending on the features and capabilities of the associated attachment mechanism 116. For example, but without limitation, the target object 104 can be mechanically grappled, an attachment mechanism 116 with a flexible element and an adhesive can be affixed to the target object 104, a member or receiver provided by the attachment mechanism 116 can be mated with a corresponding structure on the target object 104, or an exterior of the target object 104 can be pierced by an attachment mechanism 116 with an expanding element.

As a specific example, where the attachment mechanism 116 includes a central strut 308 with a penetrating tip 328, the inertia of the despin system 100 can be used to force the penetrating tip 328 through a surface or structure of the target object 104. As the penetrating tip moves further through the surface or structure, the trigger plate 312 contacts the surface or structure. Moreover, as the despin system 100 continues moving relative to the target object, the trigger plate 312 moves against the spring 316, increasing the distance between the sleeve 320 and the second end of the central strut 308. Once the sleeve 320 has moved a distance sufficient for the spring loaded arms 324 to clear the sleeve 320, the spring loaded arms 324 extend, securing the despin system 100 to the target object. As can be appreciated by one of skill in the art from the present disclosure, other configurations of attachment mechanism 116 secure the despin system 100 as described herein to a target object 104 by grappling, adhering, fixing, or otherwise joining the despin system 100 to the target object 104.

After the despin system 100 has been attached to the target object 104, the despin system 100 will spin or otherwise move with the target object 104. Over some period of time, the magnet 120, which is free to rotate in any direction relative to the carrier 128, will align its magnetic field with the external magnetic field 110 of the body 108 about which the target object 104 is orbiting (step 412). As can be appreciated by one of skill in the art after consideration of the present disclosure, a relatively stronger magnet 120 will tend to align itself with the external magnetic field 110 more quickly than a relatively weaker magnet 120. Once the magnet 120 has aligned itself with the external magnetic field 110, the inner element 124 to which the magnet 120 is fixed will move relative to the carrier 128 (step 416). This relative movement will tend to decrease (i.e. it will be damped) by friction in the interconnection 132 between the inner element 124 and the carrier 128, and the relative rotational energy will be dissipated as heat (step 420). This will in turn slow the spin rate of the target object 104 relative to the magnetic field 110 of the body 108 (step 424). After the spin rate of the target object has slowed by a sufficient amount, further operations can be performed on the target object 104 (step 428). For example, but without limitation, the target object 104 can be more easily approached for rendezvous, capture, and/or deorbit operations, and/or the despin system 100 can be disconnected from the target object 104, for example to be used to slow the spin rate of another target object 104.

In accordance with still other embodiments of the present disclosure, a damper mechanism 112 can be deployed as part of an object 104. More particularly, while the object 104 is placed into orbit about a body 108, the magnetic field of the damper mechanism 112 can be neutralized. For example, a neutralizing element 236 can be provided. As a further example, an additional magnet, with its poles aligned oppositely the polls of the magnet 120, can be used to neutralize the magnetic field of the magnet 120. In this configuration, the effect of the magnetic field associated with the damper mechanism 112 is reduced or eliminated. The magnetic field of the magnet 120 can thus be activated when desired by removing the neutralizing element 236 or by switching the orientation of the additional magnet. For example, when the object 104 has reached its end of life, the damper mechanism 112 can be activated, to maintain the object 104 in a static or relatively static configuration relative to the magnetic field 110 of the body 108, or in order to bring the object 104 into a static or relatively static configuration relative to the magnetic field 110 of the body 108.

As can be appreciated by one of skill in the art after consideration of the present disclosure, a damper mechanism 112 operates by converting the spinning energy of a target object 104 to which the damper mechanism 112 is attached into heat. Accordingly, the rotation of the target object 104 relative to an external magnetic field 110 can be reduced or eliminated, without requiring an external power source or propulsive force.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A system, comprising:
a carrier;
at least a first magnet;
an interconnection between the carrier and the first magnet, wherein the interconnection permits rotation of the first magnet in any direction relative to the carrier; and
a magnetic field neutralizing element, wherein magnetic poles of the magnetic field neutralizing element are aligned so that a north pole of the magnetic field neutralizing element is adjacent a south pole of the first magnet and so that a south pole of the magnetic field neutralizing element is adjacent a north pole of the first magnet.

2. The system of claim 1, wherein the interconnection permits the magnet to rotate in any direction about a center point.

3. The system of claim 1, wherein the interconnection includes at least one of a plurality of bearings, a set of spacers, and a viscous fluid.

4. The system of claim 1, further comprising:
an inner element, wherein the first magnet is fixed to the inner element, wherein the interconnection connects the inner element to the carrier.

5. The system of claim 4, wherein the interconnection includes:
a first surface that follows a first sphere having a first diameter, wherein the first surface is one of integral to the carrier and fixed to the carrier;
a second surface that follows a second sphere having a second diameter, wherein the second surface is one of integral to the inner element and fixed to the inner element, wherein the first diameter is greater than the second diameter.

6. The system of claim 5, wherein the first sphere and the second sphere are centered on a common center point, and wherein at least one of the first surface and the second surface is a closed spherical surface.

7. The system of claim 5, wherein at least one of the first surface and the second surface are defined by a bearing.

8. The system of claim 5, wherein the interconnection further includes a viscous fluid between the first and second surfaces.

9. The system of claim 1, wherein the interconnection is dampened.

10. The system of claim 1, further comprising:
an attachment mechanism, wherein the carrier is fixed to the attachment mechanism.

11. The system of claim 1, wherein the interconnection includes a plurality of bearings.

12. A despin system, comprising:
a damper mechanism, including:
a magnet;
an inner element, wherein the magnet is fixed to the inner element;
an interconnection;
a carrier, wherein the inner element is connected to the carrier by the interconnection, and wherein the interconnection permits rotation of the magnet relative to the carrier in any direction;
an attachment mechanism, wherein the carrier of the damper mechanism is fixed to the attachment mechanism; and
a magnetic field neutralizing mechanism, wherein in a first mode of operation the magnetic field neutralizing mechanism is operable to substantially nullify a magnetic field of the magnet, and wherein in a second mode of operation the magnetic field neutralizing mechanism has a negligible effect on the magnetic field of the magnet.

13. The system of claim 12, further comprising:
a viscous fluid, wherein the inner element includes at least a first surface that follows a first sphere, wherein the carrier includes at least a second surface that follows a second sphere that is larger than and concentric with the first sphere, and wherein the viscous fluid occupies a volume between the first and second surfaces.

14. The system of claim 13, wherein at least one of the first and second surfaces are continuous spherical surfaces.

15. The system of claim 12, wherein the inner element includes at least a first surface that follows a first sphere, wherein the carrier includes at least a second surface that follows a second sphere that is larger than and concentric with the first sphere, and wherein the interconnection includes a plurality of bearing surfaces disposed between the first and second surfaces.

16. A method for passively slowing the spin rate of orbiting objects, comprising:
neutralizing a magnetic field of a despin system using a neutralizing element, wherein magnetic poles of the neutralizing element are aligned oppositely to magnetic poles of the despin system;
placing the despin system in proximity to a target object, the despin system including a carrier, a magnet, an inner element to which the magnet is fixed, an interconnection between the carrier and the inner element, wherein the inner element and the magnet are free to rotate in any direction about a central point relative to the carrier, and an attachment mechanism to which the carrier is fixed, wherein the target object is in orbit about a body having a magnetic field;

attaching the despin system to the target object using the attachment mechanism;

after attaching the despin system of the target object, discontinuing the neutralizing of the magnetic field of the despin system;

allowing the magnet to align itself with the magnetic field of the body;

damping a movement of the magnet relative to the carrier, wherein a spin of the target object relative to the magnetic field is brought into alignment with the magnetic field of the body.

17. The method of claim 16, wherein attaching the despin system to the target object includes incorporating the despin system in the target object, wherein a magnetic field of the magnet is neutralized at least while the target object is placed into orbit about the body, and wherein discontinuing neutralizing the magnetic field of the body is performed after the despin system and the target object are in orbit about the body.

18. The method of claim 16, wherein damping a movement of the magnet relative to the carrier includes dissipating rotational energy of the target object as heat in a viscous fluid provided as part of an interconnection between the carrier and the magnet.

* * * * *